(12) United States Patent
Su et al.

(10) Patent No.: US 11,334,096 B2
(45) Date of Patent: May 17, 2022

(54) FLUID SENSOR AND MASS FLOW CONTROLLER

(71) Applicant: BEIJING SEVENSTAR FLOW CO., LTD., Beijing (CN)

(72) Inventors: Qianyi Su, Beijing (CN); Zhihui Song, Beijing (CN); Zhengtang Chen, Beijing (CN)

(73) Assignee: BEIJING SEVENSTAR FLOW CO., LTD., Beijing (CN)

( * ) Notice: Subject to any disclaimer, the term of this patent is extended or adjusted under 35 U.S.C. 154(b) by 0 days.

(21) Appl. No.: 16/626,760

(22) PCT Filed: Jul. 20, 2018

(86) PCT No.: PCT/CN2018/096495
§ 371 (c)(1),
(2) Date: Dec. 26, 2019

(87) PCT Pub. No.: WO2020/014975
PCT Pub. Date: Jan. 23, 2020

(65) Prior Publication Data
US 2021/0405664 A1 Dec. 30, 2021

(30) Foreign Application Priority Data

Jul. 17, 2018 (CN) .......................... 201810785756.X

(51) Int. Cl.
*G05D 7/06* (2006.01)
*G01F 7/00* (2006.01)
*G05B 19/416* (2006.01)

(52) U.S. Cl.
CPC ............. *G05D 7/0635* (2013.01); *G01F 7/00* (2013.01); *G05B 19/416* (2013.01); *G05B 2219/37371* (2013.01)

(58) Field of Classification Search
None
See application file for complete search history.

(56) References Cited

U.S. PATENT DOCUMENTS 5,804,717 A * 9/1998 Lucas ................... G01F 1/6847
73/202
5,824,894 A * 10/1998 Lucas ..................... G01F 15/00
73/202.5

(Continued)

FOREIGN PATENT DOCUMENTS

| CN | 101709986 | 5/2010 |
| CN | 101714003 | 5/2010 |

(Continued)

OTHER PUBLICATIONS

Chinese Search Report dated Mar. 28, 2019.

*Primary Examiner* — Paul M. West
*Assistant Examiner* — Mark A Shabman
(74) *Attorney, Agent, or Firm* — Ipsilon USA, LLP

(57) ABSTRACT

The present disclosure provides a fluid sensor and a mass flow controller. The fluid sensor comprises at least two measuring tubes whose diameters have a proportional relationship. The fluid sensor provided by the present disclosure can guarantee measurement accuracy in a whole measurement range and also can improve device reliability.

10 Claims, 3 Drawing Sheets

(56) References Cited

U.S. PATENT DOCUMENTS

| | | | | |
|---|---|---|---|---|
| 5,850,039 | A * | 12/1998 | Van Cleve | G01F 1/8413 73/861.357 |
| 6,062,077 | A * | 5/2000 | Azima | G05D 7/0635 73/204.27 |
| 6,074,691 | A * | 6/2000 | Schmitt | C23C 16/52 137/551 |
| 6,526,839 | B1 * | 3/2003 | Barger | G01F 1/8409 73/861.354 |
| 6,807,868 | B1 * | 10/2004 | Nakao | G01F 1/8413 73/861.355 |
| 7,117,751 | B2 * | 10/2006 | Berger | G01F 1/8427 73/861.355 |
| 7,614,295 | B2 * | 11/2009 | Niikawa | G01F 1/6842 73/202.5 |
| 7,826,986 | B2 * | 11/2010 | McDonald | G01F 5/00 700/282 |
| 7,891,238 | B2 * | 2/2011 | Becke | G01F 1/6845 73/170.12 |
| 7,905,139 | B2 * | 3/2011 | Lull | G01F 1/6847 73/202.5 |
| 8,485,031 | B2 * | 7/2013 | Speldrich | G01F 1/40 73/204.22 |
| 8,869,609 | B2 * | 10/2014 | Wielath | G01F 5/00 73/202 |
| 9,003,877 | B2 * | 4/2015 | Qasimi | G01F 5/00 73/204.22 |
| 9,170,142 | B2 * | 10/2015 | Van Cleve | G01F 1/8477 |
| 9,795,757 | B2 * | 10/2017 | Miller | F16L 19/005 |
| 9,952,079 | B2 * | 4/2018 | Speldrich | G01F 5/005 |
| 2004/0123672 | A1 * | 7/2004 | Wang | G01F 5/00 73/861.21 |
| 2006/0101908 | A1 * | 5/2006 | Meneghini | G01F 5/00 73/202.5 |
| 2008/0016957 | A1 * | 1/2008 | Suzuki | G01F 1/6842 73/204.21 |
| 2012/0192658 | A1 * | 8/2012 | Hussain | G01F 1/8413 73/861.357 |
| 2015/0027558 | A1 * | 1/2015 | Kehoe | G01F 1/6965 137/15.01 |
| 2016/0237565 | A1 * | 8/2016 | Sieber | C23C 16/4412 |

FOREIGN PATENT DOCUMENTS

| | | |
|---|---|---|
| CN | 101763096 | 6/2010 |
| CN | 102011885 | 4/2011 |
| CN | 103697950 | 4/2014 |
| CN | 106768113 A | 5/2017 |
| JP | 2017181213 A | 10/2017 |

\* cited by examiner

FLUID SENSOR AND MASS FLOW CONTROLLER

RELATED APPLICATION

This application is a National Phase of PCT/CN2018/096495 filed on Jul. 20, 2018, which claims the benefit of priority from Chinese Patent Application No. 2018-10785756.X filed on Jul. 17, 2018, the entirety of which are incorporated by reference.

TECHNICAL FIELD

The present disclosure relates to the field of fluid measurement, in particular to a fluid sensor and a mass flow controller.

BACKGROUND

Measuring devices used for fluid flow measurement have various types and are widely applied. Fluid sensors have important applications in scientific research and production in fields of semiconductor microelectronic industry, special material development, chemical industry, petroleum industry, medicine, environmental protection, and vacuum. With the improvement of productivity in these fields, requirements for the fluid sensors are getting higher and higher. Particularly, in production lines of semiconductors and large-scale integrated circuits, the fluid sensors are required to have not only high measurement accuracy and wide measurement range, but also reliable performance.

For existing fluid sensors, the measurement accuracy can meet the requirements only when a measured flow is within a certain flow range (generally 25%-100% of a full-scale flow of the fluid sensor), but can hardly be guaranteed when the measured flow is smaller than 25% of the full-scale flow. Therefore, the existing flow sensors cannot meet the requirements of high accuracy put forward by rapid development in the semiconductor field. In addition, in some fields requiring high reliability, such as the aerospace field and the nuclear field, designs of the existing fluid sensors cannot meet the requirements of reliability in these fields.

SUMMARY

The present disclosure aims to solve at least one of the technical problems in the prior art, and provides a fluid sensor and a mass flow controller, which can guarantee measurement accuracy in a whole measurement range and improve device reliability.

To achieve the object of the present disclosure, there is provided a fluid sensor, comprising at least two measuring tubes whose inside diameters have a proportional relationship.

Optionally, the inside diameters of the at least two measuring tubes are the same.

Optionally, the inside diameters of the at least two measuring tubes are different.

Optionally, a number of the at least two measuring tubes is two; and a ratio of the inside diameters of the two measuring tubes is greater than or equal to 1:2.

Optionally, the measuring tube includes a middle portion and two bent portions located on two sides of the middle portion, the two bent portions being parallel to each other and perpendicular to the middle portion;

the fluid sensor further includes:

a base, wherein at least two first mounting grooves are provided on a first surface of the base, and two first through holes penetrating through the base in a direction perpendicular to the first surface are provided at outer sides of two ends of each first mounting groove, respectively; and the middle portion of each measuring tube is located in the first mounting groove, and the two bent portions pass through the two first through holes, respectively.

Optionally, the fluid sensor further includes:

pressing blocks, wherein a number of the pressing blocks is the same as a number of the at least two first through holes, and the pressing blocks are at least partially disposed in the first through holes in a one-to-one correspondence; a second through hole having an inside diameter smaller than that of the first through hole is provided in each of the pressing blocks; and the bent portion passes through the first through hole and the second through hole successively, and a seal is provided between the bent portion and the second through hole.

Optionally, the middle portion of each measuring tube is coated with a thermal insulation material, and the thermal insulation material is filled in the first mounting groove.

Optionally, a second mounting groove is disposed at one side of each of the first mounting grooves and on the first surface of the base;

the fluid sensor further includes:

a terminal plate disposed in the second mounting groove; and a sensing wire wound around the measuring tube and electrically connected to the terminal plate.

Optionally, the fluid sensor further includes:

a cover plate disposed on the first surface of the base and fixedly connected to the base, with a third through hole being disposed in the cover plate at a position corresponding to each terminal plate; and a plurality of terminals electrically connected to the terminal plates through a plurality of third through holes in a one-to-one correspondence.

As another technical solution, the present disclosure further provides a mass flow controller, including the above fluid sensor provided by the present disclosure.

Optionally, the mass flow controller further includes:

an inflow port;

a flow divider connected to the inflow port and including an internal channel; the flow divider being configured to divide a fluid flowing out of the inflow port into each measuring tube of the fluid sensor and the internal channel according to a predetermined flow ratio;

a fluid channel having a gas inlet end connected to a gas outlet end of the internal channel, and a flow control valve being disposed on the fluid channel; and an outflow port connected to the gas outlet end of the fluid channel.

Optionally, the mass flow controller further includes:

a control circuit board configured to receive a flow detection signal sent from the fluid sensor, calculate a difference between the flow detection signal and a set flow value, and control the flow control valve to adjust a flow of a fluid passing through the fluid channel according to a calculation result until the flow of the fluid is equal to the set flow value.

The present disclosure has the following beneficial effects:

the fluid sensor provided by the present disclosure includes at least two measuring tubes whose inside diameters have a proportional relationship. Therefore, different fluid flow ratios of the at least two measuring tubes may be obtained by setting different proportional relationships, so as to meet requirements of measurement accuracy and reliability. For example, the inside diameters of the two measuring tubes may be different and have a certain proportional relationship, so that at least two measuring tubes with proper inside diameters may be selected for measurement according to an actual flow, thereby ensuring that the measurement accuracy in the whole measurement range can meet the requirements. As another example, the inside diameters of two measuring tubes may be the same, in this case, one of the two measuring tubes may be selected to operate, and the other one may be used as a spare tube, so as to avoid a situation that the entire device is scrapped due to damage of the measuring tube, thereby improving the reliability of the device.

By adopting the fluid sensor provided by the present disclosure, the mass flow controller provided by the present disclosure can guarantee the measurement accuracy in the whole measurement range and improve reliability of the device.

DETAILED DESCRIPTION

Figure 1:
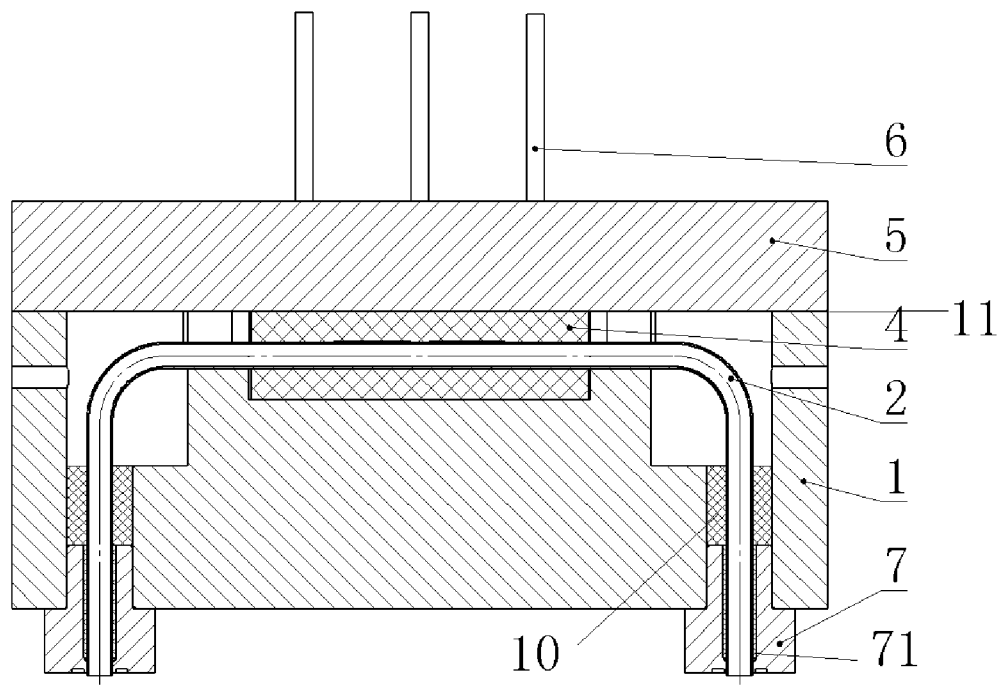
FIG. 1 is a cross-sectional view of a fluid sensor provided by the present disclosure.

In order to enable those skilled in the art to better understand the technical solution of the present disclosure, the fluid sensor and the mass flow controller provided by the present disclosure are described in detail below with reference to the accompanying drawings.

The present disclosure provides a fluid sensor, which includes at least two measuring tubes whose inside diameters have a proportional relationship.

In practical application, different fluid flow ratios of the at least two measuring tubes may be obtained by setting different proportional relationships, so as to meet requirements of measurement accuracy and reliability in different occasions.

For example, in the fields requiring high reliability, such as the aerospace field and the nuclear field, the inside diameters of two measuring tubes may be made the same, so that one of the two measuring tubes may be selected to operate, and the other one may be used as a spare tube, so as to avoid a situation that the entire device is scrapped due to damage of the measuring tube, thereby improving the reliability of the device.

As another example, in production lines such as production lines of semiconductors and large-scale integrated circuits, an accuracy of the fluid sensor is required to be 1% within a whole measurement range. In order to meet the requirement, the inside diameters of the two measuring tubes may be made different and have a certain proportional relationship, so that at least one measuring tube with a proper inside diameter may be selected to perform measurement according to an actual flow, thereby ensuring that the measurement accuracy within the whole measurement range can meet the requirement.

In a case that the number of the measuring tubes is two, a ratio of inside diameters of the two measuring tubes may be generally set to 1:2 in consideration of actual needs and manufacturing processes; and since a fluid flow in the measuring tube is proportional to a fourth power of the inside diameter of the measuring tube, it may be obtained that a fluid flow ratio of the two measuring tubes is 1:16. Thus, measurement may be performed in sections according to the fluid flow ratio of the measuring tubes. For example, when the fluid flow is relatively large and is in the range of 25% to 100% of the full-scale flow, the measurement is performed by using the measuring tube with the smaller inside diameter; conversely, when the fluid flow is relatively small and is in the range of 0% to 25% of the full-scale flow, the measurement is performed by using the measuring tube with the larger inside diameter. For another example, the ratio of the inside diameters of the two measuring tubes may be set to 0.7:1, and then it may be obtained that the fluid flow ratio of the two measuring tubes is 0.24:1. Thus, when the fluid flow is relatively large and is in the range of 24% to 100% of the full-scale flow, the measurement is performed by using the measuring tube with the smaller inside diameter; conversely, if the fluid flow is relatively small and is in the range of 0% to 24% of the full-scale flow, the measurement is performed by using the measuring tube with the larger inside diameter. This sectional measurement mode may ensure that the measurement accuracy in the whole measurement range meets the requirement.

Actually, in the sectional measurement mode, flow measuring devices having two measurement ranges are integrated together to form a flow measuring device having a wider measurement range, which is similar to integration of rulers having different scales (such as a meter stick and a vernier caliper), as such, the meter stick is used for measurement if an object to be measured has a large length, and the vernier caliper is used for measurement if the object to be measured has a small length, thereby ensuring that the measurement accuracy in the whole measurement range can meet the requirement.

Of course, in practical application, the ratio of the inside diameters of the two measuring tubes may be set according to different requirements. In addition, the number of the measuring tubes may be three, four, five or more, and the more the types of the inside diameters are, the more sections the measurement is divided into, so that the measurement accuracy can be further improved.

Figure 2:
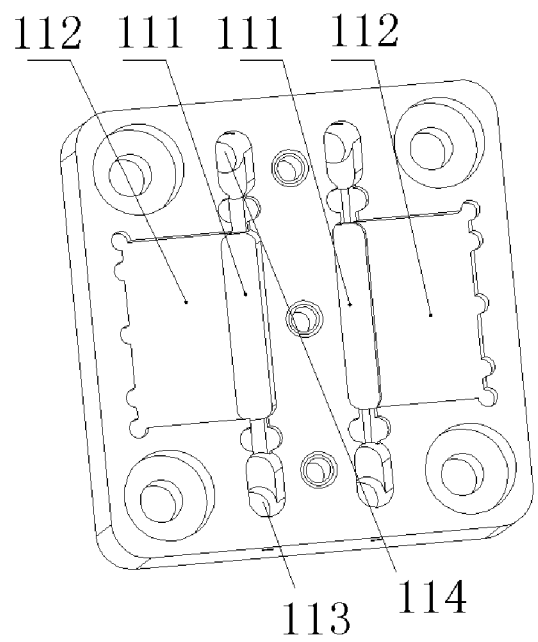
FIG. 2 is a schematic structural diagram of a base used in an embodiment of the present disclosure.

Specific implementations of the fluid sensor provided by embodiments of the present disclosure are described in detail below. Specifically, referring to FIGS. 1 to 3, the fluid sensor includes two measuring tubes 2, each of which is a capillary tube, and is bent, and specifically the bent structure includes a middle portion and two bent portions located on two sides of the middle portion, the two bent portions being parallel to each other and perpendicular to the middle portion.

Moreover, the fluid sensor further includes a base 1, two first mounting grooves 111 are provided on a first surface 11 of the base 1, and two first through holes (113, 114) penetrating through the base 1 in a direction perpendicular to the first surface are provided at outer sides of two ends of each first mounting groove 111, respectively. The middle portion of each measuring tube 2 is located in the first mounting groove 111, and the two bent portions pass through the two first through holes (113, 114) corresponding to the first mounting groove 111, respectively, so that ends of the two bent portions can be exposed from the base 1 and connected with corresponding pipes (not shown).

In this embodiment, the fluid sensor further includes pressing blocks 7 whose number is equal to the number of the first through holes, and the pressing blocks 7 are at least partially disposed in the first through holes in a one-to-one correspondence. Specifically, the pressing blocks 7 may be fixed to the base 1 by bonding or any other means. Furthermore, a second through hole having an inside diameter smaller than that of the first through hole is provided in each of the pressing blocks 7. The bent portion of the measuring tube 2 passes through the first through hole and the second through hole successively, and a seal 71 is provided between the bent portion of the measuring tube 2 and the second through hole to define a position of the bent portion and seal a gap between the measuring tube 2 and the second through hole. The seal 71 may be a sealant or a seal ring, etc.

Figure 4:
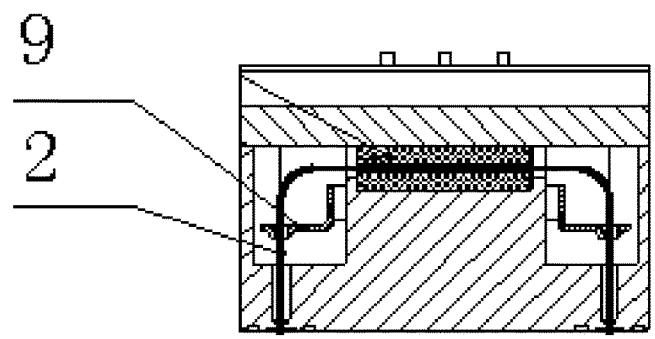
FIG. 4 is another cross-sectional view of a fluid sensor provided in an embodiment of the present disclosure.

It should be noted that, in this embodiment, the bent portions of the measuring tubes 2 are fixed by the pressing blocks 7, but the present disclosure is not limited thereto, and the measuring tubes 2 may be fixed by any other means in practical applications. For example, as shown in FIG. 4, the bent portions of the measuring tube 2 may be fixed by a bracket 9. Specifically, the bracket 9 adopts a bent structure similar to the measuring tube 2, and a groove may be provided on one side of each of the first mounting grooves 111, a middle portion of the bracket 9 is located in the groove, and two bent portions of the bracket 9 are respectively located at positions corresponding to the two bent portions of the measuring tube 2, a fixing hole is provided in each bent portion of the bracket 9, and each bent portion of the measuring tube 2 passes through the fixing hole in the corresponding bent portion of the bracket 9, so as to define the position of the bent portion of the measuring tube 2.

By using the bracket 9, the pressing blocks 7 may be omitted, and only the through holes through which each measuring tube 2 may pass are provided on the base 1, that is, the base 1 may be of an integral structure, which can simplify structure of the device, facilitate manufacturing, and reduce cost.

In this embodiment, the middle portion of each measuring tube 2 is coated with a thermal insulation material 4 which is provided in the first mounting groove 111. By use of the thermal insulation material 4, heat loss of the measuring tube 2 can be reduced, and a position of the middle portion of the measuring tube 2 in the first mounting groove 111 can be defined. The thermal insulation material 4 may be thermal insulation cotton or the like.

Optionally, a thermal insulation material 10 is provided in the first through hole and above the pressing block 7, and partially covers the bent portion of the measuring tube 2.

In this embodiment, on the first surface 11 of the base 1, a second mounting groove 112 is disposed at one side of each of the first mounting grooves 111. Moreover, the fluid sensor further includes terminal plates 3 and sensing wires (not shown), and the terminal plate 3 is disposed in the second mounting groove 112. The sensing wire is wound around the measuring tube 2, and is electrically connected to the terminal plate 3 so as to transmit a detection signal to the terminal plate 3.

Figure 3:
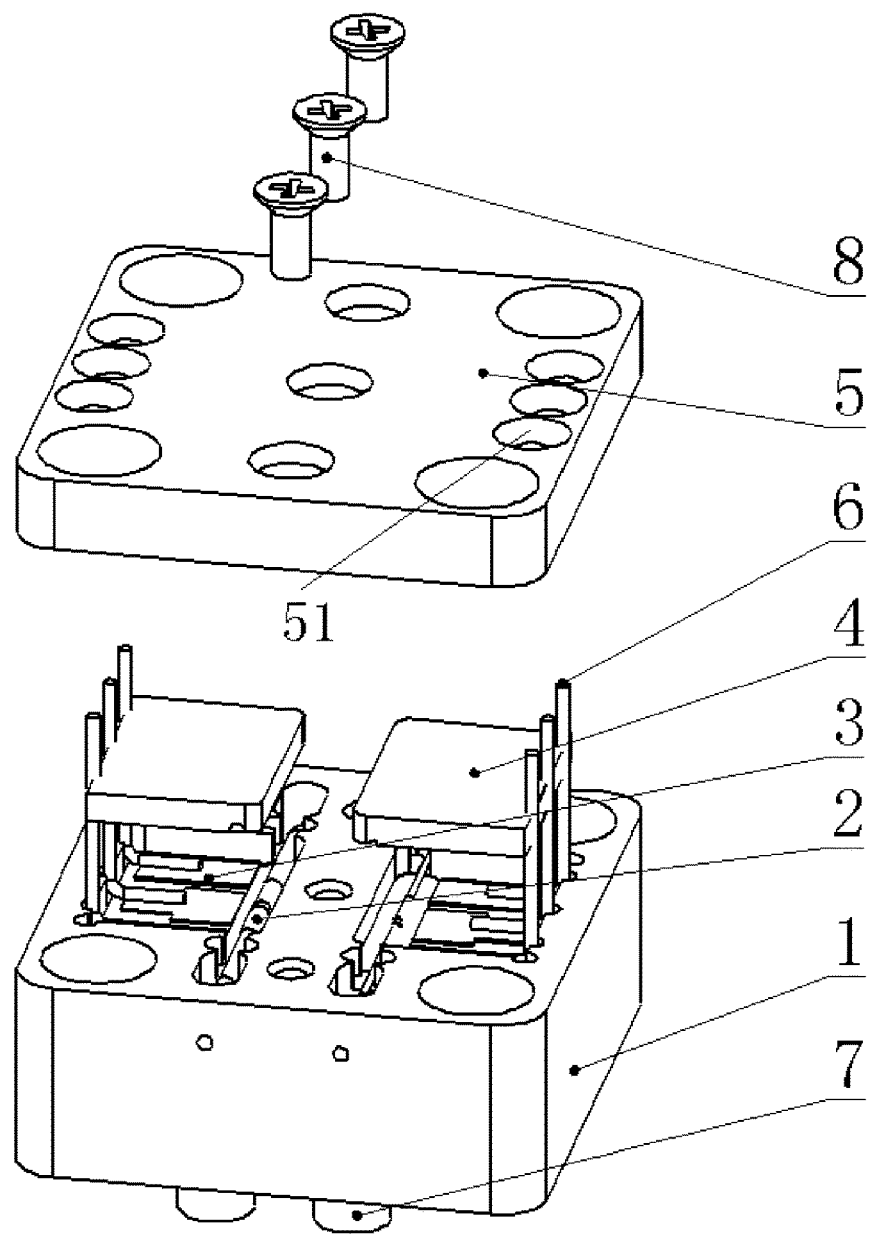
FIG. 3 is an exploded view of a fluid sensor according to an embodiment of the present disclosure.

In this embodiment, as shown in FIG. 3, the fluid sensor further includes a cover plate 5 and a plurality of terminals 6. The cover plate 5 is disposed on the first surface 11 of the base 1 and fixedly connected to the base 1 by screws 8, and a third through hole 51 is provided in the cover plate 5 at a position corresponding to each terminal plate 3; and the plurality of terminals 6 are electrically connected to the terminal plates 3 through the plurality of third through holes 51 in a one-to-one correspondence.

In summary, the fluid sensor provided by the present disclosure can guarantee measurement accuracy in the whole measurement range and also can improve reliability of the device.

As another technical solution, the present disclosure further provides a mass flow controller, including the above fluid sensor provided by the present disclosure.

Figure 5:
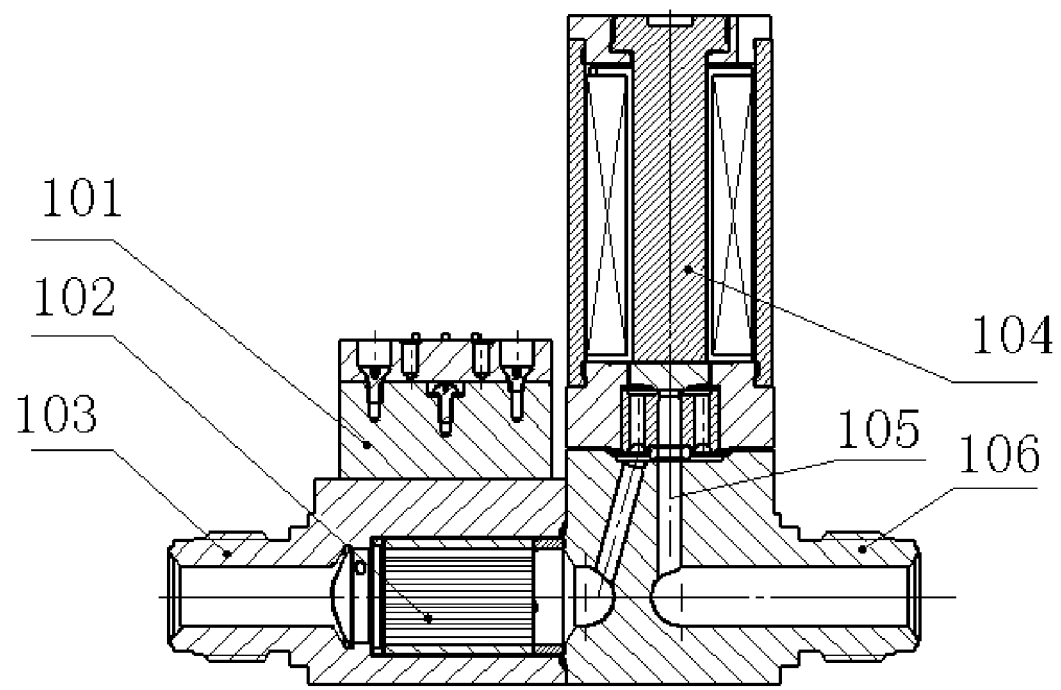
FIG. 5 is a cross-sectional view of a mass flow controller provided by the present disclosure.
Figure 6:
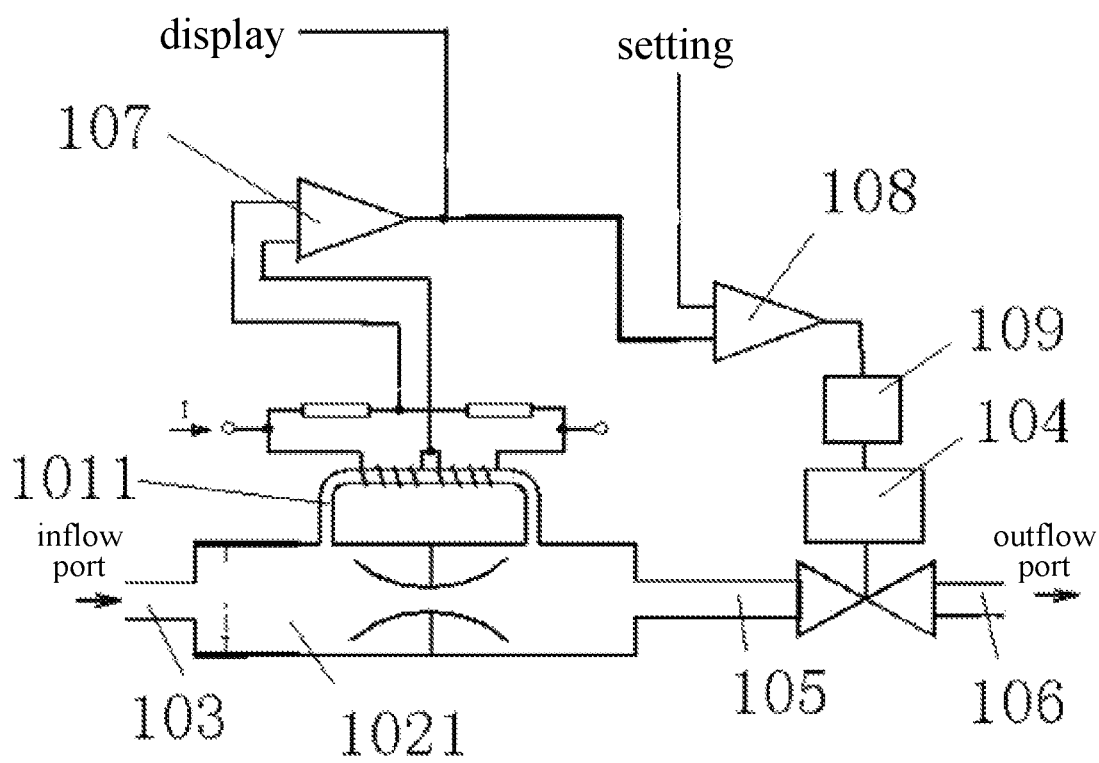
FIG. 6 is a block diagram illustrating a principle of a mass flow controller provided in an embodiment of the present disclosure.

Specifically, referring to FIG. 5 and FIG. 6, in this embodiment, the mass flow controller includes a fluid sensor 101, a flow divider 102, an inflow port 103, a flow control valve 104, a fluid channel 105, and an outflow port 106. The flow divider 102 is connected to the inflow port 101 and includes an internal channel 1021. The flow divider 102 is used to divide a fluid flowing out of the inflow port 101 into respective measuring tubes 1011 of the fluid sensor 101 and the internal channel 1021 at a predetermined flow ratio. A gas inlet end of the fluid channel 105 is connected to a gas outlet end of the internal channel 1021. The flow control valve 104 is disposed on the fluid channel 105 and is used to adjust a flow of the fluid in the fluid channel 105. The outflow port 106 is connected to the gas outlet end of the fluid channel 105.

In this embodiment, the mass flow controller further includes a control circuit board (not shown) for receiving a flow detection signal sent from the fluid sensor 101, calculating a difference between the flow detection signal and a set flow value that has been input, and controlling the flow control valve 104 to adjust the flow of the fluid passing through the fluid channel 105 according to a calculation result until the flow of the fluid is equal to the set flow value.

Specifically, an amplifier 107 is used to amplify the flow detection signal sent from the fluid sensor 101, and output the amplified signal to a comparator 108, the comparator 108 performs a difference comparison on the amplified signal and the set flow value, and obtains a flow adjustment amount through PID operation, and then a driver 109 drives the flow control valve 104 to adjust the flow of the fluid passing through the fluid channel 105 until the flow of the fluid is equal to the set flow value, thereby realizing detection and control of a gas flow.

By adopting the fluid sensor provided by the present disclosure, the mass flow controller of the present disclosure can guarantee measurement accuracy in the whole measurement range and improve reliability of the device.

It should be understood that the above embodiments are merely exemplary embodiments employed for illustrating the principles of the present disclosure, and the present disclosure is not limited thereto. Various modifications and improvements made by those skilled in the art without departing from the spirit and essence of the present disclosure should be considered to fall within the protection scope of the present disclosure.

What is claimed is:

1. A fluid sensor, comprising at least two measuring tubes whose inside diameters have a proportional relationship,
   each measuring tube comprises a middle portion and two bent portions located on two sides of the middle portion, the two bent portions being parallel to each other and perpendicular to the middle portion;
   the fluid sensor further comprises:
   a base, wherein at least two first mounting grooves are provided on a first surface of the base, and two first through holes penetrating through the base in a direction perpendicular to the first surface are provided at outer sides of two ends of each first mounting groove, respectively; and the middle portion of each measuring tube is located in the first mounting groove corresponding to the measuring tube, and the two bent portions pass through the two first through holes, respectively;

the fluid sensor further comprises:

pressing blocks, wherein a number of the pressing blocks is the same as a number of the first through holes, and the pressing blocks are at least partially disposed in the first through holes in a one-to-one correspondence; a second through hole is provided in each pressing block, and the second through hole has an inside diameter smaller than that of the first through hole corresponding to the pressing block where the second through hole is located; and the bent portion passes through the first through hole and the second through hole successively, and a seal is provided between each bent portion and the second through hole corresponding to the bent portion.

2. The fluid sensor of claim 1, wherein the inside diameters of the at least two measuring tubes are the same.

3. The fluid sensor of claim 1, wherein the inside diameters of the at least two measuring tubes are different.

4. The fluid sensor of claim 3, wherein a number of the at least two measuring tubes is two; and
   a ratio of the inside diameters of the two measuring tubes is greater than or equal to 1:2.

5. The fluid sensor of claim 1, wherein a thermal insulation material is provided in each first mounting groove to coat the middle portion of the measuring tube corresponding to the first mounting groove.

6. The fluid sensor of claim 1, wherein a second mounting groove is disposed at one side of each of the first mounting grooves and on the first surface of the base;
   the fluid sensor further comprises:
   a terminal plate disposed in the second mounting groove; and
   a sensing wire, wherein each of the measuring tubes is wound by the sensing wire, respectively, and the sensing wire is electrically connected to the terminal plate.

7. The fluid sensor of claim 6, further comprising:
   a cover plate disposed on the first surface of the base and fixedly connected to the base, wherein a third through hole is provided in the cover plate at a position corresponding to each terminal plate; and
   a plurality of terminals, wherein each of the terminals is electrically connected to a terminal plates through the third through holes corresponding to each terminal plate, respectively.

8. A mass flow controller, comprising the fluid sensor according to claim 1.

9. The mass flow controller of claim 8, further comprising:
   an inflow port;
   a flow divider connected to the inflow port and comprising an internal channel; the flow divider being configured to divide a fluid flowing out of the inflow port into each measuring tube of the fluid sensor and the internal channel according to a predetermined flow ratio;
   a fluid channel having a gas inlet end connected to a gas outlet end of the internal channel,
   wherein a flow control valve is disposed on the fluid channel; and
   an outflow port connected to the gas outlet end of the fluid channel.

10. The mass flow controller of claim 9, further comprising:
   a control circuit board configured to receive a flow detection signal sent from the fluid sensor, calculate a difference between the flow detection signal and a set flow value, and control the flow control valve to adjust a flow of a fluid passing through the fluid channel according to a calculation result until the flow of the fluid is equal to the set flow value.

* * * * *